United States Patent [19]

Kouda et al.

[11] Patent Number: 5,799,934
[45] Date of Patent: Sep. 1, 1998

[54] BATTERY CONVEY JIG

[75] Inventors: Minoru Kouda, Hirakata; Hiroyuki Usui, Chigasaki; Masatoshi Hoshi, Moriguchi, all of Japan

[73] Assignee: Matsushita Electric Industrial Co., Ltd., Osaka, Japan

[21] Appl. No.: 583,798

[22] Filed: Jan. 5, 1996

[30] Foreign Application Priority Data

Jan. 5, 1995 [JP] Japan .................. 7-000259

[51] Int. Cl.$^6$ ................................................ B23Q 3/00
[52] U.S. Cl. .................. 269/287; 269/329; 269/909; 198/690.1; 198/803.14
[58] Field of Search ............................. 269/8, 287, 288, 269/292, 294, 329, 909; 279/128; 198/690.1, 803.6, 803.14, 803.15, 350, 439, 440, 441, 450, 459.2

[56] References Cited

U.S. PATENT DOCUMENTS

| | | | |
|---|---|---|---|
| 2,360,928 | 10/1944 | Beechlyn | 279/128 |
| 2,383,008 | 8/1945 | Meister | 269/8 |
| 2,743,001 | 4/1956 | Nordquist | 198/439 |
| 2,920,739 | 1/1960 | Woldin | 198/441 |
| 2,953,970 | 9/1960 | Maynard | 279/128 |
| 3,098,552 | 7/1963 | Schulz | 198/439 |
| 3,226,888 | 1/1966 | Erenyi | 269/9 |
| 3,320,564 | 5/1967 | Sosey et al. | 269/8 |
| 3,889,797 | 6/1975 | Naito et al. | 198/350 |
| 4,337,856 | 7/1982 | Dorner | 198/690.1 |
| 4,707,819 | 11/1987 | Elhara | 369/77.2 |
| 5,373,633 | 12/1994 | Satoi et al. | 29/468 |

FOREIGN PATENT DOCUMENTS

| | | | |
|---|---|---|---|
| 0035957 | 3/1979 | Japan | 198/350 |
| 404358625 | 12/1992 | Japan | 198/690.1 |

OTHER PUBLICATIONS

"Magnetic Belt Coding" article, pp. 53–55, Apr. 1963.

*Primary Examiner*—Robert C. Watson
*Assistant Examiner*—Thomas W. Lynch
*Attorney, Agent, or Firm*—McDermott, Will & Emery

[57] ABSTRACT

The invention is intended to realize a battery convey jig capable of efficiently conveying and sorting in conveying step, in a manufacturing process of a variety of batteries. The jig is cylindrical, having a hole for accommodating a battery in the center, and an iron ring of a great specific gravity is buried as a weight in the lower part of the jig. Hence, stable supporting and conveying may be realized without increasing the bottom size of the jig.

17 Claims, 3 Drawing Sheets

BATTERY CONVEY JIG

BACKGROUND OF THE INVENTION

The present invention relates to a battery convey jig capable of conveying batteries or battery constituent members in a manufacturing process of a variety of batteries, and sorting in the conveying process, efficiently.

In the manufacture of batteries, and in order to process mass production of batteries promptly, high speed conveyance of batteries or battery constituent members is demanded aside from the fast assembly of the batteries. In addition, from the viewpoint of space-saving, resource-saving, and energy-saving, there is an increasing demand for a battery convey jig having the characteristics of small size, light weight, non-tumbling battery structure, low noise output due to collision or friction of mutual jigs, low frictional force or wear, stability during temperature or humidity changes, and stable in dimensions.

Batteries, which are slender and likely to tumble, are often assembled in the parts in standing position in the conveying process or in the process to completed products. Accordingly, in order to convey the batteries in a standing position by using a conveyor, and while preventing tumbling of batteries, a structure such as disclosed in Japanese Laid-open Utility Model No. 63-26626 has been employed. As shown in FIG. 6, as a conveying jig of a battery 1, a ring-shaped jig 20 made of synthetic resin or metal having a central hole is used. A groove 3 in a ring form is cut in the outer circumference of the jig 20 to guide the jig 20 or to prevent tumbling along a conveyor 5.

As further proposed in FIG. 7(A) and 7(B), when separating and taking out the jigs 20 one-by-one, while conveying multiple jigs 20 continuously by using the conveyor 5, a pin 4 of a smaller diameter than the width of the groove 3 is projected and inserted into the groove 3, from an orthogonal direction to the running direction of the jigs 20. This limits the conveyance of jigs 20, and a gap is formed between adjacent jigs 20, so as to be separated and taken out one-by-one. Moreover, the cylindrical surface of the jig 20 is processed by surface forming cut for orienting the direction to define the position (or angle) of the battery accommodated in the jig 20.

Other proposals include surface hardening treatment on the end surface or outer circumference of aluminum or other metal ring, and lining of the cylindrical surface with resin or other shock absorbing material to lower noise or prevent formation of flaw or burr. Such battery convey jigs are mostly small in diameter, and tumbling cannot be prevented without help of a guide or other like structure. Even if it is possible to convey in the horizontal direction by using the conveyor, it was impossible to convey in a vertically inclined direction or a vertical direction.

Further, for the purpose of increasing the stability in the state being accommodated in the jig, an increase of outside diameter of jig is not preferred from the viewpoint of efficient use of space or increase of conveying speed.

Still further, jigs capable of sampling certain batteries for inspection automatically, out of multiple batteries flowing at high speed, are also demanded.

SUMMARY OF THE INVENTION

According to the invention, a battery convey jig is characterized by forming a hole for accommodating a battery or battery constituent member in the center of a main body having a cylindrical profile, and positioning its center of gravity in the lower part of the main body.

Preferably, the battery convey jig comprises a main body formed of a synthetic resin, and a weight having a specific gravity greater than that of the resin disposed near the bottom thereof.

Further, a weight is formed on the main body which has a greater specific gravity than that of the resin and is comprised of a magnetic material, such as iron formed in a ring set in one of several plural types differing in height.

Still further, a jig number memory device may be incorporated with the battery convey jig. As pointed out in greater detail below, this invention provides important advantages of forming the profile of the main body in a cylindrical form, and positioning the center of gravity of a jig to accommodate and convey a battery or battery constituent member in its central hole, at its lower part. Moreover, by using a weight of large specific gravity, preferably a weight of magnetic material is positioned inside in the vicinity of the bottom of a jig made of synthetic resin, and more specifically an iron ring, tumbling may be prevented.

In more detail, the central hole of the jig is defined in its depth, shape and precision enough for positioning the conveying object, that is, the battery. The central hole holds the battery without allowing looseness, and the bottom of the battery that is accommodated in the jig is substantially expanded by the bottom of the jig. In addition, by making use of the magnetic force, tumbling can be prevented more securely, and when the batteries are fed into an assembling machine or processing machine by using this jig, positioning or standing of batteries can be controlled easily, so that the productivity may be enhanced.

The invention itself, together with further objects and attendant advantages, will best be understood by reference to the following detailed description taken in conjunction with the accompanying drawings.

DESCRIPTION OF THE PREFERRED EMBODIMENTS

Figure 1:
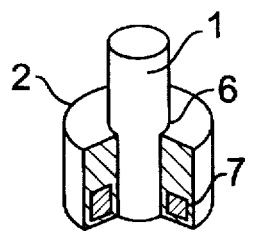
FIG. 1 is a partial sectional view of a battery convey jig in an embodiment of the invention.

Referring now to the FIGS. 1-5 of the drawings, the preferred embodiments of the invention are described in detail below. As shown in FIG. 1, a jig 2 includes a main body having a cylindrical profile that is formed of polyacetal resin, having a hole 6 for accommodating a battery 1 in the center. Near the lower end of the inside of this jig 2, an iron ring 7 of large specific gravity is buried, and the center of gravity of the jig 2 is lowered. By way of presenting an example of a jig suited to manufacture of UM3 dry cells (13.1 mm in outside diameter, 50 mm in height), the jig 2 measures 30 mm in outside diameter, 13.3 mm in inside diameter, and 22 mm in height, and the iron ring 7 buried in the jig 2 measures 28 mm in outside diameter, 17 mm in inside diameter, and 8 mm in height.

As the material for the main body of the jig 2, a resin excellent in dimensional stability against temperature and humidity changes and less in wear is preferred, and specifically polyacetal resin or polyamide resin may be used. In this embodiment, the iron ring 7 is buried near the lower end of the resin-made jig 2.

Figure 2:
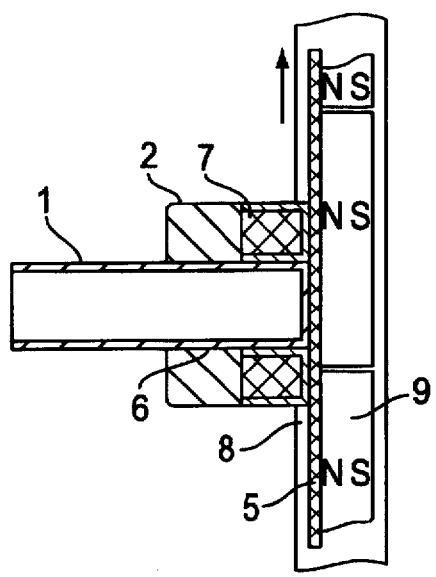
FIG. 2 is a schematic drawing showing the state of conveying batteries by using the battery convey jig in the embodiment of the invention.

As illustrated in FIG. 2, a schematic diagram shows the mode of conveying the jig 2 accommodating the battery 1 in the hole 6 in a vertical up/down direction by making use of a conveyor belt 5. The iron ring 7 buried near the bottom of the jig 2 is mutually attracted to a permanent magnet 9 fixed in a conveyor frame 8, across the conveyor belt 5. By properly setting the magnetic force of the permanent magnet 9, the frictional force acting between the bottom of the jig 2 and the conveyor belt 5 can be easily set larger than the total weight of the jig 2 and battery 1. Besides, by incorporating the conveyor belt or turntable having a magnetic force into the jig 2, it is possible to convey easily in any direction, e.g., horizontal, inclined, or vertical. In this manner, the battery 1 can be conveyed three-dimensionally, and from the viewpoint of space-saving, it is excellent. Moreover, by using the magnetic force from the bottom side of the jig 2, it is furthermore effective for preventing tumbling of the jig.

Figure 3:
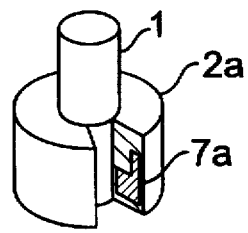
FIG. 3 is a partial sectional perspective view of a battery convey jig in other embodiment of the invention.

As illustrated in FIG. 3, a battery convey jig is shown in another embodiment of the invention. The shape of an iron ring 7a buried in a jig 2a has a step, being thick in the lower part and thin in the upper part as shown in the drawing, which prevents the center of gravity of the jig 2a from becoming higher. When applied to this jig 2a, having 10 mm above the step, the iron ring 7a has an overall height of 18 mm.

Figure 4:
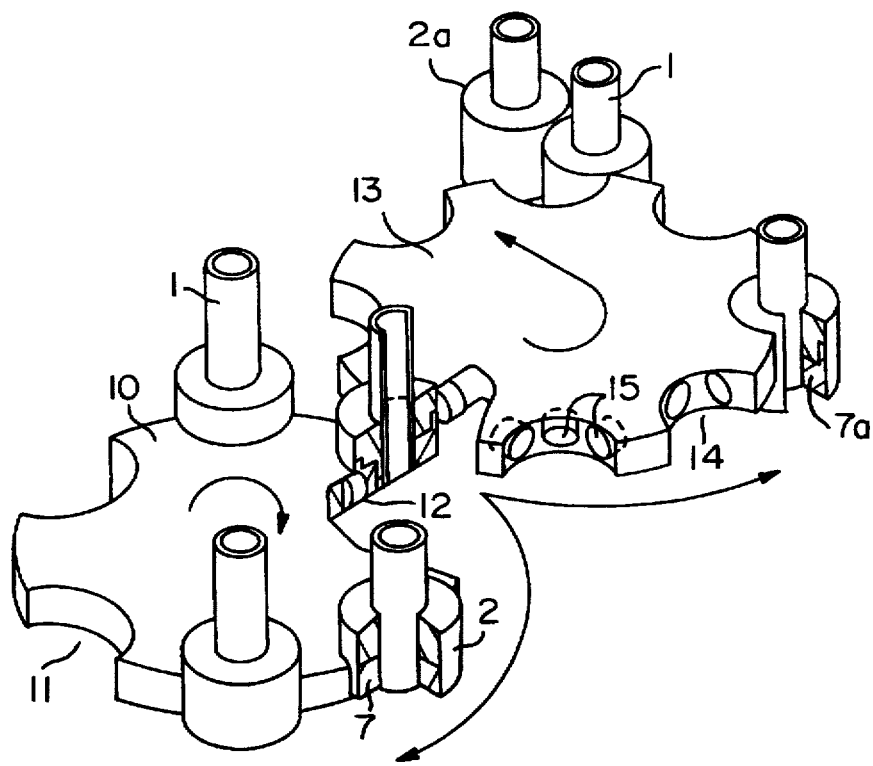
FIG. 4 is a schematic drawing showing the mode of sampling by using the battery convey jig in the other embodiment of the invention.

As illustrated in FIG. 4, a mode of sampling of batteries is shown by the difference in shape of the iron rings buried in the jig 2 in FIG. 1 and the jig 2a in FIG. 3. A permanent magnet 12 is provided at the side of a jig accommodating part 11, which is a recess on the outer circumference of a turntable 10. A permanent magnet 15 is also provided at the side of a jig accommodating part 14, which is also a recess on the outer circumference of turntable 13. As compared with the permanent magnet 12, the permanent magnet 15 is greater in magnetic force and is set at higher position, and only a slight magnetic force acts on the jig 2 in which a low iron ring 7 is buried, but a stronger force acts on the jig 2a in which a high iron ring 7a is buried. A jig transfer position is set on a line linking the centers of the turntables 10, 13, and the timing of rotation is adjusted so that the jig accommodating parts 11 and 14 of the both turntables 10, 13 may come to this position simultaneously.

In FIG. 4, when the jig 2 in which the low iron ring 7 is buried is conveyed from the left side in FIG. 4 to the jig transfer position by the jig accommodating part 11 of the turntable 10, it is simultaneously accommodated in the jig accommodating part 14 of the turntable 13. At this time, magnetic forces act on the iron ring 7 of the jig 2 from both permanent magnets 12 and 15, but the attraction force of the permanent magnet 12 acts stronger due to the difference in mounting position (i.e., difference in height) of the permanent magnets 12 and 15. Therefore, the jig 2 is not transferred between the turntables, and the turntable 10 conveys the jig 2. On the other hand, when the jig 2a in which the high iron ring 7a is buried is conveyed into the jig transfer position by the jig accommodating part 11 of the turntable 10, magnetic forces of both permanent magnets 12 and 15 act on the iron ring 7a of the jig 2a. In this case, since the iron ring is high, the attraction force of the permanent magnet 15 is stronger than the attraction force of the permanent magnet 12, the jig 2a is transferred between the turntables 10 and 13. Furthermore, as the turntables 10, 13 rotate, the jig 2a is conveyed by the jig accommodating part 14 of the turntable 13, and the battery 1 can be sampled. In this sampling step, the turntable may be either in intermittent rotation or in continuous rotation.

Variations on the embodiments described above are possible. For example, the shape of the iron ring 7 is not limited to the ring shape alone, but depending on the conveying object and jig shape, a press processed piece of proper shape such as a disk and cup may be buried. Alternately, a resin-made ring filled with iron powder may be also used.

In another variation, aside from using permanent magnets as mentioned above, by using electromagnets, further advanced sorting of jigs and other controls may be realized. As an example of sampling, a jig number memory device is incorporated in the jig 2, and when a jig number reading device or magnetic sorting device is used in combination therewith in contact-free configuration, more effective quality control activity may be realized. As the jig number memory device, for example, a number memory unit of ID sensor is built inside the jig 2.

In yet another variation, as a specific example of sampling, sampling may be done for checking fluctuations in filling amount of compound in the filling step.

Figure 5:
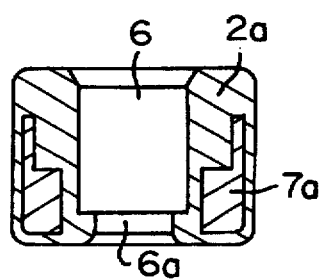
FIG. 5 is a sectional view of a battery convey jig in a different embodiment of the invention.
Figure 6:
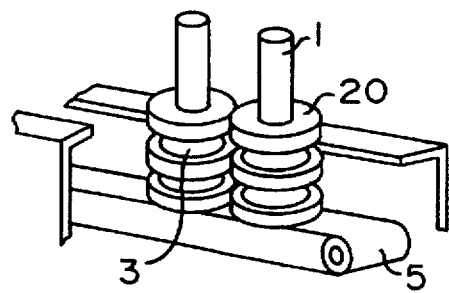
FIG. 6 is a perspective view of a conventional battery convey jig.
Figure 7A:
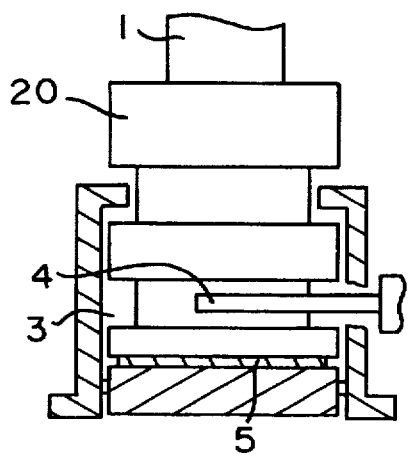
FIGS. 7(A) and 7(B) show the mode of processing using the conventional battery convey jig.
Figure 7B:
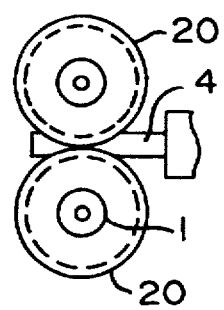

In yet a further variation, FIG. 5 shows another example in which the lower opening of the hole 6 is smaller in diameter than the upper part. In this construction, the protrusion of battery or the like may be prevented from projecting out of the jig. Not limited to this example, the shape of the hole may be properly selected depending on the shape and properties of the batteries.

The embodiments described above provide a number of significant advantages. Specifically, by forming the profile of the main body in a cylindrical form, the center of gravity of a jig is positioned for accommodating and conveying a battery or battery constituent member in its central hole, at its lower part. Moreover, by using a weight of large specific gravity, preferably a weight of magnetic material positioned inside in the vicinity of the bottom of a jig made of a synthetic resin, and more specifically an iron ring, tumbling may be prevented.

As yet another advantage, the central hole of the jig is defined in its depth, shape and precision enough for positioning and conveying the battery. The central hole holds the battery without allowing looseness, and the bottom of the battery is accommodated in the jig is substantially expanded by the bottom of the jig. In addition, by making use of the magnetic force, tumbling can be prevented more securely. Also, and when the batteries are fed into an assembling machine or processing machine by using this jig, positioning or standing of batteries can be controlled easily, so that the productivity may be enhanced.

Of course, it should be understood that a wide range of changes and modifications can be made to the preferred embodiment described above. It is therefore intended that the foregoing detailed description be understood that it is the following claims, including all equivalents, which are intended to define the scope of this invention.

What is claimed is:

1. A battery convey jig comprising,
a main body, and
a weight,
wherein said main body is characterized by having a hole for accommodating a battery or battery constituent member in a center of the main body having a cylindrical profile,
wherein said weight is positioned in said main body such that a center of gravity of the battery convey jig is in a lower part of the battery convey jig,
wherein the main body is composed of a synthetic resin,
wherein the weight has a specific gravity greater than that of the synthetic resin and is disposed near the lower part of the main body,
wherein the weight is an iron ring, and
wherein the iron ring has at least two parts, with one part being thick and disposed in the lower part of the main body and another part being thin and disposed in an upper part of the main body.

2. A battery convey jig comprising,
a main body, and
a weight,
wherein said main body is characterized by having a hole for accommodating a battery or battery constituent member in a center of the main body having a cylindrical profile,
wherein said weight is positioned in said main body such that a center of gravity of the battery convey jig is in a lower part of the battery convey jig,
wherein the main body is composed of a synthetic resin,
wherein the weight is an iron ring composed of a magnetic material, and
wherein the iron ring has at least two parts, with one part being thick and disposed in the lower part of the main body and another part being thin and disposed in an upper part of the main body.

3. The battery convey jig of claim 1 or 2,
wherein said ring has a step shape, said one part being thick in the lower part of said main body and said another part being thin in the upper part of said main body.

4. A battery convey jig comprising,
a main body, and
a weight,
wherein said main body is characterized by having a hole for accommodating a battery or battery constituent member in a center of the main body having a cylindrical profile,
wherein said weight is positioned in said main body such that a center of gravity of the battery convey jig is in a lower part of the battery convey jig,
wherein the main body is composed of a synthetic resin, and
wherein the synthetic resin is selected from the group consisting of polycetal resin and polyamide resin.

5. A battery production system comprising:
a battery convey jig, and
a conveyor having a conveyor belt for conveying a battery,
wherein said battery convey jig comprises:
a main body, and
a weight,
wherein said main body has a cylindrical profile and a hole for accommodating a battery or battery constituent member in a center of said main body, and
wherein said weight is disposed in a lower part of said main body.

6. The battery production system according to claim 5,
wherein said main body of said battery convey jig is composed of a synthetic resin material.

7. The battery production system according to claim 5,
wherein said weight has a ring shape with two parts, one part being thick and disposed in the lower part of the main body and another part being thin and disposed in an upper part of the main body, and further comprising,
another battery convey jig,
wherein said another battery convey jig includes:
a main body, and
a weight,
wherein said main body has a cylindrical profile and a hole for accommodating a battery or battery constituent member in a center of said main body, and
wherein said weight has a ring shape disposed in a lower part of said main body.

8. The battery production system according to claim 5,
wherein said weight is composed of a material selected from the group consisting of a magnetic material and iron.

9. The battery production system according to claim 8, further comprising:
a permanent magnet provided near the conveyor for mutually attracting said weight.

10. The battery production system according to claim 9,
wherein a frictional force between the battery convey jig and the conveyor is set greater than a total weight of the battery convey jig and a battery accommodated in the battery convey jig.

11. The battery production system according to claim 5, further comprising:
a memory device provided inside the battery convey jig, and
a reading device for sensing a jig number recorded in said memory device.

12. A battery production system comprising:
a battery convey jig, and
a first and a second turntable,
the first and the second turntable having a semicircular recess on an outer circumference of the first and the second turntable,
said battery convey jig having a main body and a weight,
said main body having a cylindrical profile and a hole for accommodating a battery or battery constituent member in a center of said main body, and
said weight being disposed in a lower part of said main body, and
wherein a timing of rotating the first and the second turntable is adjusted so as to accommodate said battery convey jig in said semicircular recess simultaneously.

13. The battery production system according to claim 12,
wherein said main body of said battery convey jig is composed of a synthetic resin material.

14. The battery production system according to claim 12,
wherein at least two types of battery convey jigs are provided, one type of battery jig having a weight in the form of a ring, and disposed in the lower part of the main body; and another type of battery jig having a weight in the form of a ring, with one part of the ring being thick and disposed in the lower part of the main body, and another part of the ring being thin and disposed in an upper part of the main body.

15. The battery production system according to claim 12, wherein said weight is composed of a material selected from the group consisting of a magnetic material and iron.

16. The battery production system according to claim 15 further comprising:

a first magnet provided at a side wall of said semicircular recess of said first turntable, and a second magnet provided at a side wall of said jig accommodating recess of said second turntable.

17. The battery production system according to claim 16, wherein said first magnet is provided at the lower part of said side wall, said second magnet is provided at the higher part of said side wall, and said second magnet has greater magnetic force than that of said first magnet.

* * * * *